(12) United States Patent
Takada et al.

(10) Patent No.: US 6,639,656 B2
(45) Date of Patent: Oct. 28, 2003

(54) DISTANCE MEASURING APPARATUS

(75) Inventors: Yuji Takada, Kyoto (JP); Satoshi Furukawa, Hirakata (JP); Atsuyuki Hirono, Kobe (JP); Motoo Ikari, Kyoto (JP)

(73) Assignee: Matsushita Electric Works, Ltd., Osaka (JP)

(*) Notice: Subject to any disclaimer, the term of this patent is extended or adjusted under 35 U.S.C. 154(b) by 0 days.

(21) Appl. No.: 10/098,566

(22) Filed: Mar. 18, 2002

(65) Prior Publication Data
US 2002/0131033 A1 Sep. 19, 2002

(30) Foreign Application Priority Data
Mar. 19, 2001 (JP) ........................... 2001-079367

(51) Int. Cl.[7] ............... G01C 3/08; H03K 5/53; H04N 5/121; H04N 5/213; H04N 5/217
(52) U.S. Cl. .................. 356/4.01; 356/5.03; 327/60; 348/607
(58) Field of Search .................. 356/4.01, 4.06, 356/5.03, 5.04, 3.01–5.15; 327/60, 63, 77; 348/619

(56) References Cited

U.S. PATENT DOCUMENTS

| | | | |
|---|---|---|---|
| 5,194,908 A | * | 3/1993 | Lougheed et al. ............. 356/28 |
| 5,257,121 A | * | 10/1993 | Steinberg ..................... 358/447 |
| 5,644,386 A | * | 7/1997 | Jenkins et al. ............. 356/4.01 |
| 5,856,667 A | | 1/1999 | Spirig et al. |
| 5,870,180 A | * | 2/1999 | Wangler ...................... 356/4.01 |
| 6,323,941 B1 | * | 11/2001 | Evans et al. ................. 356/4.01 |

FOREIGN PATENT DOCUMENTS

| | | |
|---|---|---|
| JP | 0-356677 | 12/2000 |
| WO | 96/15626 | 5/1996 |
| WO | 97/09819 | 3/1997 |

OTHER PUBLICATIONS

English Language Abstract of JP 2000–0356677.

* cited by examiner

Primary Examiner—Thomas H. Tarcza
Assistant Examiner—Brian Andrea
(74) Attorney, Agent, or Firm—Greenblum & Bernstein, P.L.C.

(57) ABSTRACT

Disclosed is a distance measuring apparatus for measuring a distance to a target object also its shape precisely without influence of noise, which is applied to a invader monitoring system. This apparatus comprises a clock signal generator unit, a modulated light projector unit, a light receiver unit, and a demodulator unit, and obtains a range image presenting signal levels changing according to the distances to the objects including the target object by irradiating light onto the objects and receiving reflected light. In the demodulator unit, the range image is processed for evaluating and removing noise components, for interpolating and averaging noise removed region, and for selecting the target object region. Those processes are carried out from the following point of view, the variation of the distance signal levels, the received quantity of light, and the variation of the received quantity of light. Thus a range image without no noise and including substantially only the target object data is obtained, and therefore it is possible to measure a distance to the target object and its shape precisely without influence of noise.

23 Claims, 12 Drawing Sheets

PRIOR ART

DISTANCE MEASURING APPARATUS

BACKGROUND OF THE INVENTION

This invention relates to a distance measuring apparatus capable of measuring a distance to a target object, for example a human body, and also measuring its shape.

Conventionally, there has been a distance measuring apparatus available such that it gets a range image by an active method i.e. by using projected light and measures a distance to a target. FIG. 18 shows a block diagram of such a conventional distance measuring apparatus A'. This conventional apparatus has a clock signal generator unit 1 which generates a clock signal CK to synchronize light irradiation and reception, a modulated light projector unit 2 which projects light Pt modulated in brightness and a predetermined frequency and synchronized with the signal CK, a light receiver unit 3 which receives reflected light from a target object TG such as a human body and transforms the received light to received-light-signal and outputs the signal to a demodulator unit 4' which will be used to form an image including information (namely a range image) showing distances of objects including the target object TG.

The demodulator unit 4' demodulates the received-light-signal which is synchronous with the clock signal CK, that is, the signal corresponding to modulated reflected-light Pt'. The light Pt' originates in the modulated light Pt, and is also return-light from the target object TG and other objects after projection and reflection.

The light receiver unit 3 has a light receiving device of two dimension in which many image elements are arrayed in matrix. The unit 3 reads out signal charges corresponding to a received quantity of light from each image element, and gets received-light-signals by processing the signal charges.

The demodulator unit 4' comprises a microcomputer and memories, and executes above-mentioned demodulation process with a pre-installed program so as to extract signals corresponding to the reflected-light Pt' from the above-mentioned received-light-signal which is output by the unit 3.

Through the demodulation process, the unit 4' obtains the distance information to the objects in a form of signal level using the extracted signals based on the time differences, in other words, phase differences between the light Pt and the reflected-light Pt', and forms the range image in which above-mentioned distances to the objects are expressed by using the signal levels. Hence a distance to the target object TG and its shape (two dimensional shape) are measurable by using this range image obtained in the demodulator unit 4'. The range image is output to a display unit B to be displayed there.

Such a conventional apparatus A' is configured, for example, by using optical system of lenses so that reflected-light from objects is fed onto the light receiving device in the light receiver unit 3, and is used as a monitoring apparatus to monitor an invader, a target object TG, entering into the monitored area.

FIG. 19 shows signal levels along one horizontal line of a range image obtained by the demodulator unit 4'. The signal level is defined in the manner that the near the object is, the higher the signal level is. This figure shows a situation that a target object TG having a spherical shape is at the forward center of the light receiving device.

In general natural light and/or reflected disturbing light Pn are received along with the reflected-light of modulated light Pt by the light receiver unit 3 as shown in FIG. 18. Those components equivalent to the modulated light Pt results in noises which is superimposed on the range image. For example, as shown in FIG. 19, there can be seen noise components in the both sides of a half circle. The half circle is a shape image of the target object TG. The signal levels are largely changing in a small span because of noise.

As another case, if the quantity of light coming into the light receiver unit 3 is too small, the output signal level of the light receiving devise becomes so low that noise components are superimposed on the range image. Noises may be superimposed also on the waveform of the target object TG, and these are omitted in FIG. 19.

Such noise components tends to increase when large fluctuation of the received quantity of light occurs. Followings are those cases that the quantity of light received by the light receiver unit 3 is small, the objects have various reflection coefficients, or near and far objects are mixed in the scene.

The range image on which noises are superimposed is uneasy to see when displayed by the display unit B. Besides the noises in the range image tends to obstruct many kind of data processing in the successive stages.

SUMMARY OF THE INVENTION

In view of the above, it is an object of the invention to provide a distance measuring apparatus that can remove the noise components in a range image.

According to an aspect of the present invention, an apparatus for measuring a distance to a target object and a shape of the target object with a range image which is obtained beforehand and contains information of distances to objects including the target object comprises following two means.

One is a range image obtaining means which obtains the range image by irradiating light onto the objects and receiving reflected light from the objects by a light receiving device. The range image presents signal levels which changes according to the distances to the objects, Another one is a range image processing means which divides the obtained range image into a number of unit-range-images so as to discard every unit-range-image as noise if variation of a signal level in the unit-range-image exceeds a pre-determined threshold, and to save every unit-range-image as usable range image if variation of signal levels in the unit-range-image dose not exceed the threshold.

Consequently, prevailing noise components in the range image can be removed by discarding the unit-range-images as noise in which the variation of the signal levels exceeds predetermined threshold. As the results, almost all noises are removed from the range image which is composed of unit-range-images such that the variation of the signal levels in them dose not exceeds predetermined threshold.

Thus, there is a technical advantage in this apparatus since it can be performed precisely without influence of noises to measure the distance to the target object and the shape of the target object.

According to a further aspect of the present invention, the range image processing means interpolates the discarded unit-range-images by using unit-range-images in which variation of signal levels does not exceed the threshold and which are next to the discarded unit-range-images, or by using an average value calculated from a plurality of unit-range-images in which variation of signal level does not exceed the threshold.

Consequently, a further technical advantage is achieved by the interpolation, that is, background information around the target object can be available, in other words, it is impossible to use background information if the discarded unit-range-images are left discarded without interpolation.

According to a further aspect of the present invention, the range image processing means defines a central-range-image locating in the middle of serial unit-range-images in which variation of signal levels does not exceed the threshold, and selects unit-range-images which has signal levels fall between a representative signal level of the central-range-image and a signal level calculated by adding a predetermined value to the representative signal level or by subtracting a predetermined value from the representative signal level.

Consequently, a further technical advantage is achieved that processing time can be reduced when the shape of the target object is substantially included in the above-mentioned selected unit-range-images and if it is enough to detect partially the target object.

According to a further aspect of the present invention, the range image processing means differentiates every unit-range-image in the range image such that unit-range-images regarded as noise are already discarded from it, so that a background image displaying other than the target object is removed.

Consequently, a further technical advantage is achieved that boundaries between the target object and its background can be made clear.

An apparatus for measuring a distance to a target object and a shape of the target object with a range image which is obtained beforehand and contains information of distances to objects including the target object comprises following means.

A range image obtaining means obtains the range image by irradiating light onto the objects and receiving reflected light from the objects by a light receiving device. The range image presents signal levels which changes according to the distances to the objects. And the means defines a plurality of base-regions composed of predetermined number of serial picture elements in the light receiving device.

And the means performs one or two of following two processes;
(1) process for executing a range image obtaining process except for every base-region in which the received quantity of light is less than a predetermined level criterion, and
(2) process for executing a range image obtaining process except for every plurality of serial base-regions in which an average value of the received quantity of light is less than a predetermined level criterion.

Consequently, processing time is reduced since it can be skipped to execute a range obtaining process for the base-region in which received quantity of light is insufficient based on the comparison of the received quantity of light or the average value of the received quantity of light with each criterion.

According to a further aspect of the present invention, the range image obtaining means does not execute a range image obtaining process for the base-regions when variation of the received quantity of light between neighboring base-regions exceeds a predetermined value even though the received quantity of light or the average value of received quantity of light is not less than the predetermined level criterion in the base-region.

Consequently, distance measuring performance and reliability increase since base-regions such that variation of received quantity of light in them is so large between neighboring base-regions that the variation exceeds a predetermined value are removed, and therefore serial picture elements can be removed collectively from the process objects of the range image obtaining process.

In detail, even if the received quantity of light is sufficient, its large variation deteriorates the reliability of distance measurement, and the deterioration is suppressed by above-mentioned removal.

According to a further aspect of the present invention, the range image processing means regards a region of the range image described bellow as noise and assigns a uniform signal level to the region. The above-mentioned region is the region corresponding to the base-regions in which variation of the received quantity of light exceeds a predetermined threshold, or the region in which the variation of signal levels exceeds a predetermined threshold.

Consequently, measurement of the distance to the target object or the shape can be performed precisely without influence of noises since there are few noises in the region where a uniform signal level is not assigned as the result of above-mentioned noise removal from the view point of the variation evaluation.

According to a still further aspect of the present invention, the range image processing means recognizes a following region of the range image to be distance information which is showing a shape of the target object, while as to noise region the means assigns three kind of levels to the noise region according to the shape of the target object. The above-mentioned region is the region corresponding to the base-region in which variation of the received quantity of light does not exceeds a predetermined threshold, or the region having such signal levels that any variation of them does not exceeds a predetermined threshold.

And above-mentioned three kind of levels assigned to the noise region are as follows. In comparison with periphery of the target object, if the middle of the object has; first, a convex shape toward near side, a signal level of far enough position from the target object is assigned to the noise region; second, a concave shape from near side view, a signal level of near enough position from the target object is assigned to the noise region; and third, both convex and concave shapes toward near side, a signal level of mid position between convex and concave parts of the target object is assigned to the noise region.

Consequently, the shape of the target object is made clear since noise region are leveled.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS OF THE PRESENT INVENTION

First Embodiment

Figure 1:
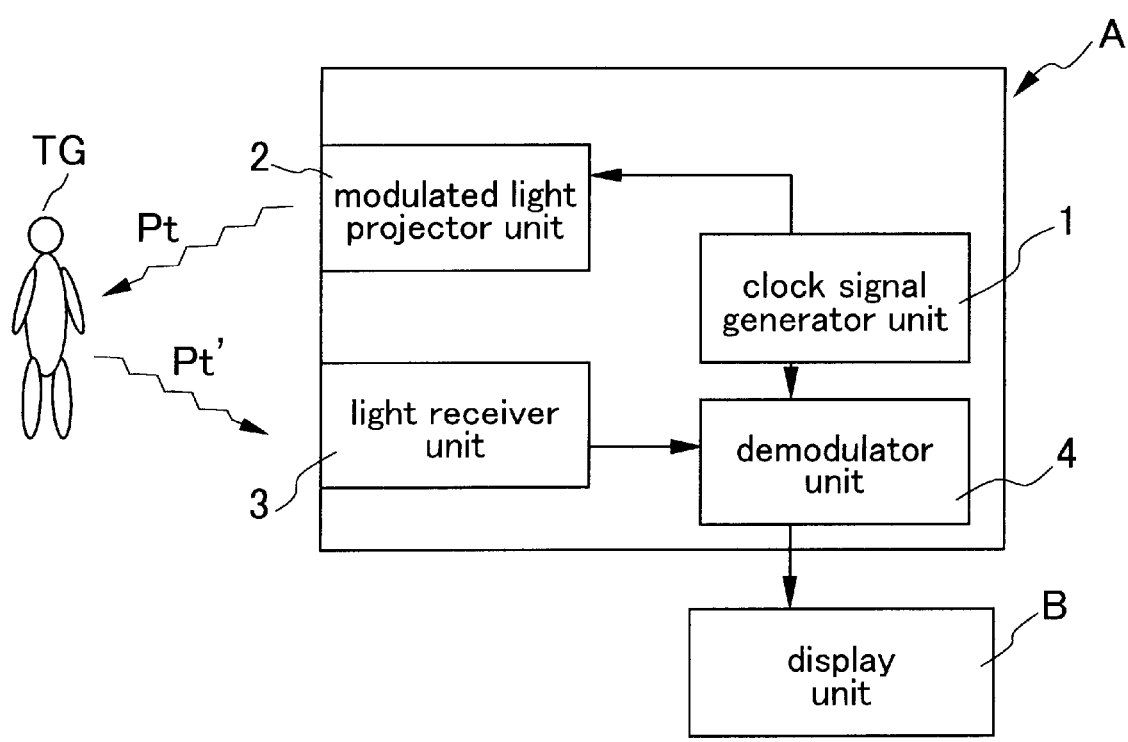
FIG. 1 is a block diagram for showing the arrangement of a distance measuring apparatus according to a first embodiment of the present invention.

FIG. 1 is a block diagram for showing a configuration of a distance measuring apparatus according to a first embodiment of this invention. This embodiment has, as the same as the conventional apparatus, a clock signal generator unit 1, a modulated light projector unit 2, a light receiver unit 3, and a demodulator unit 4.

The clock signal generator unit 1, the modulated light projector unit 2, the light receiver unit 3, and the demodulator unit 4 are comprised in a range image obtaining means which obtains the range image of objects including a target object TG.

The demodulator unit 4 is comprised in a range image processing means which removes noises in the range image.

As the range image obtaining process using unit 1, unit 2, unit 3, and unit 4 is the same as conventional, description about this process is omitted here, and only process of noise removal from the range image carried by the demodulator unit 4 is described.

This embodiment is supposed to be used for monitoring an invader entering into a monitoring area, and a target object TG is supposed to be one invader or a human body.

Figure 2:
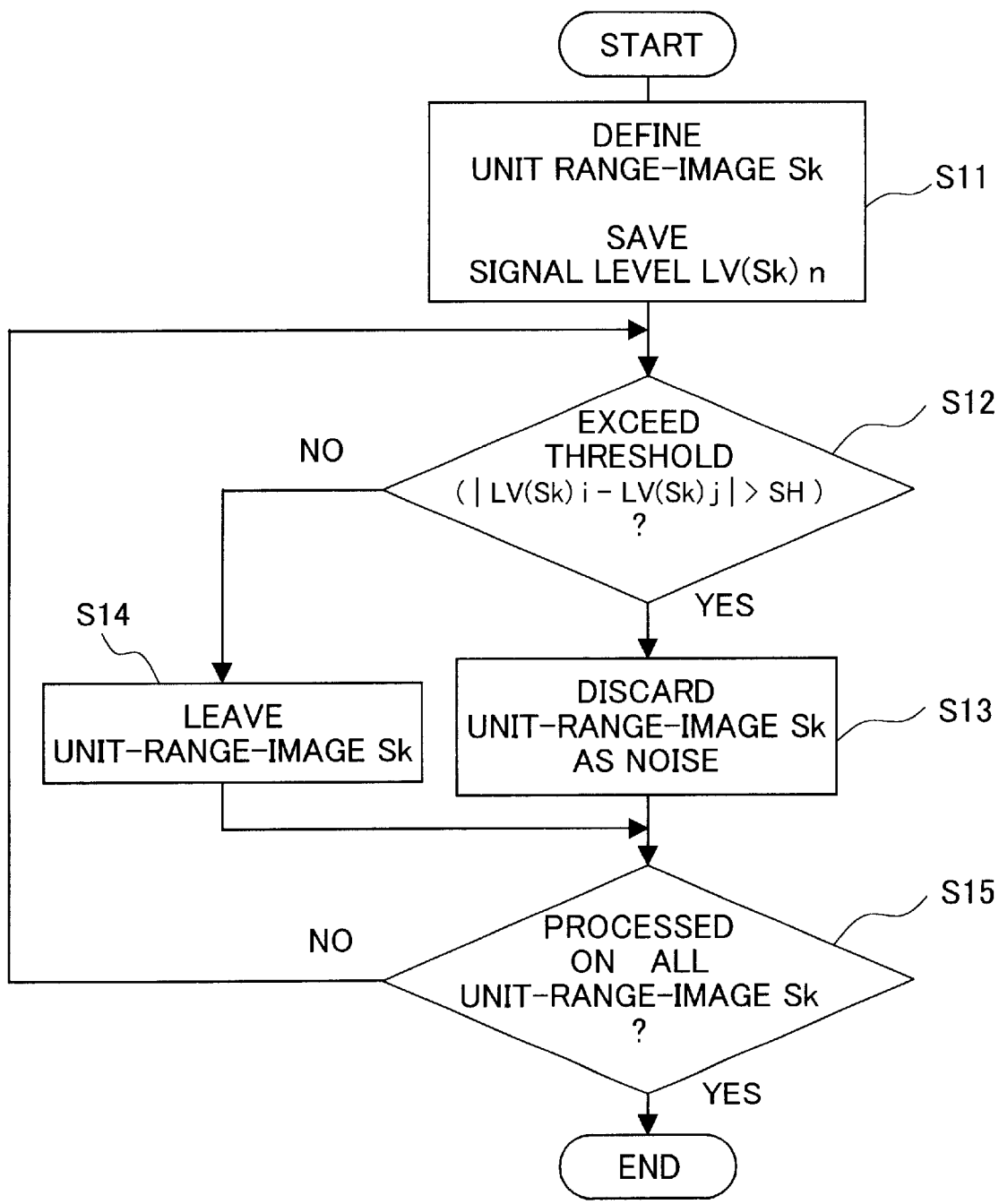
FIG. 2 is a flow chart for explaining the operation of the first embodiment.
Figure 3:
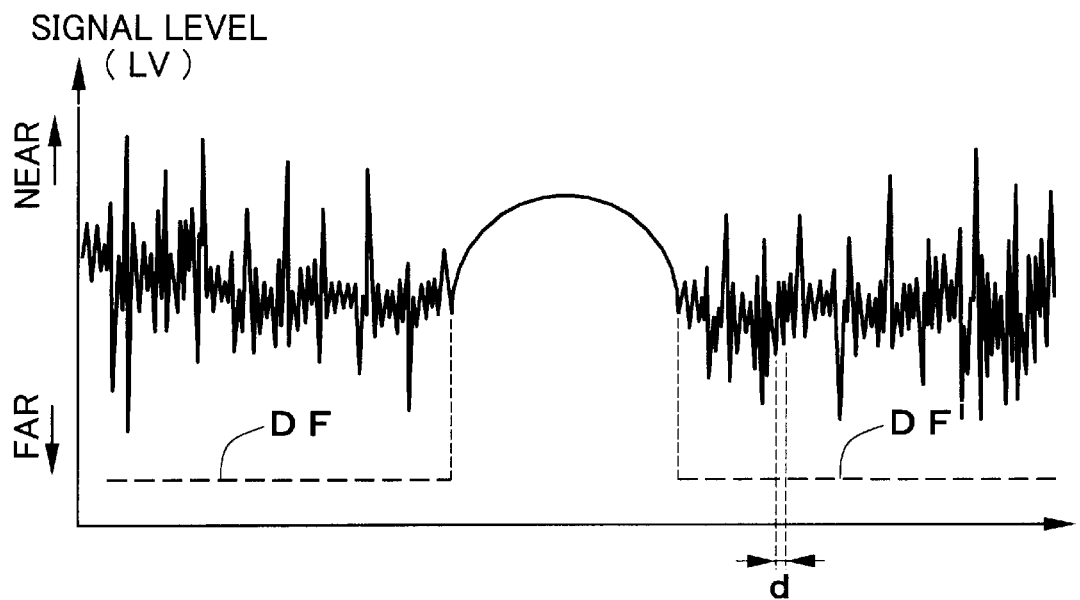
FIG. 3 is a signal level waveform chart for explaining the operation of the first embodiment.

FIG. 2 is a flow chart explaining the noise removal process by the demodulator unit 4. FIG. 3 is a waveform of signal levels LV along one horizontal line of a range image obtained under the situation that a target object TG having a sphere-like shape exists at the forward center of a light receiving device in the light receiver unit 3. Correspondingly, a half circle shape is seen in the center of FIG. 2 showing the shape of the target TG, and at both sides of it there can be seen superimposed noise components.

First, in the demodulator unit 4, unit-range-images Sk k=1,2, . . . are defined in the obtained range image with a plurality of unit regions made of range image divided in matrix.

In detail, the unit-range-images in the range image are defined in correspondence to picture segments in a picture plane formed by two dimensionally arrayed picture elements (pixel) of the light receiving devise in the light receiver unit 3, that is, the plane is divided so as to get picture segments having a plurality of neighboring picture elements, for example a 2-by-2 picture segment having 4 picture elements.

In this embodiment, unit-range-images corresponding to a 2-by-1 and 3-by-1 picture segment are used, but this invention is not restricted to those cases.

Second, all signal levels LV(Sk)n n=1,2, . . . in the unit-range-image Sk are stored in the memory(step S11).

Next, in the demodulator unit 4, variations of the signal levels in the unit-range-image Sk are evaluated whether they exceeds a predetermined threshold or not(step S12). As an example, the unit-range-image Sk corresponding to section "d" in FIG. 3 has largely varying signal levels LV(Sk)n because of superimpose of noise as shown in FIG. 4.

Figure 4:
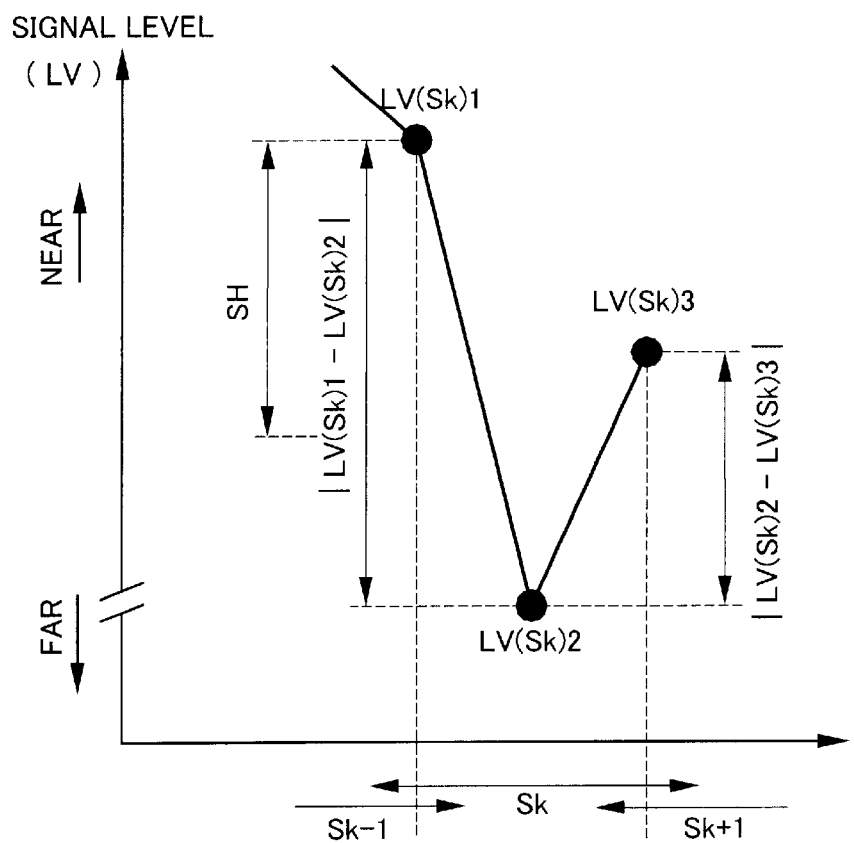
FIG. 4 is a chart for explaining the operation of the first embodiment.

The demodulator unit 4 compares the absolute values of the differences LV(Sk)1–LV(Sk)2 and LV(Sk)2–LV(Sk)3 with the predetermined threshold SH, and if any one of the absolute value of differences exceeds SH as in FIG. 4, discards or erases the unit-range-image Sk namely four signal levels LV(Sk)1, LV(Sk)2, and LV(Sk)3 from the memory for reason that these are noise(step S13).

Here, the signal levels LV(Sk)n in the discarded unit-range-image Sk are set as zero which means infinite, and are shown by doted lines in FIG. 3. Because the side end signal levels LV(Sk)1 or LV(Sk)3 in the unit-range-image Sk are also the member of unit-range-image Sk−1 or Sk+1 in the both side of Sk, if Sk−1 or Sk+1 is not a noise component, LV(Sk)1 or LV(Sk)3 is not discarded.

If any absolute value of the differences does not exceed the threshold, the unit-range-image Sk is regarded as not noise, then stores it in the memory(step S14). It is judged weather the above step S12–S14 are done or not for all unit-range-images Sk, and if not, step S12 is executed for next unit-range-image (NO in step S15).

After above-mentioned step S12–S14 execution for all unit-range-image Sk(YES in step S15), a processed range image is obtained in which no noise components and only the distance data of the target object TG are included.

In this embodiment, the target object TG is supposed to be one human body, if variations of the signal levels LV(Sk)n do not exceed a threshold SH, it is uniquely determined that the unit-range-image Sk shows a target object TG having smooth shape like human body.

Thus a range image is obtained which includes only the target object TG expressed by not discarded unit-range-images Sk after discard of the unit-range-images Sk having signal levels LV(Sk)n of which variation exceeds a threshold SH.

As the results, the distance to the target object TG and the shape of it can be measured precisely without influence of noise.

In this embodiment, the shape of the target object TG is supposed to be a convex hemisphere toward near side, however, for a concave hemisphere from near side view, or for any shape of smooth surface other than hemisphere also in the same way noise components can be removed.

Moreover, in this embodiment, two dimensional light receiving devise is equipped in the light receiver unit 3, however, the arrangement of the light receiver unit 3 is not restricted to this, for example one dimensional light receiving device can be used to scan the modulated light.

Second Embodiment

This embodiment has a feature that interpolation processes are executed in the demodulator unit 4, that is, the discarded unit-range-images Sk are interpolated by using other unit-range-images Sk in which variation of signal levels LV(Sk) does not exceed a threshold SH and which are next to the discarded unit-range-images.

The arrangement of this embodiment is the same as of the first embodiment, thus figures and explanation about this are omitted.

Figure 5:
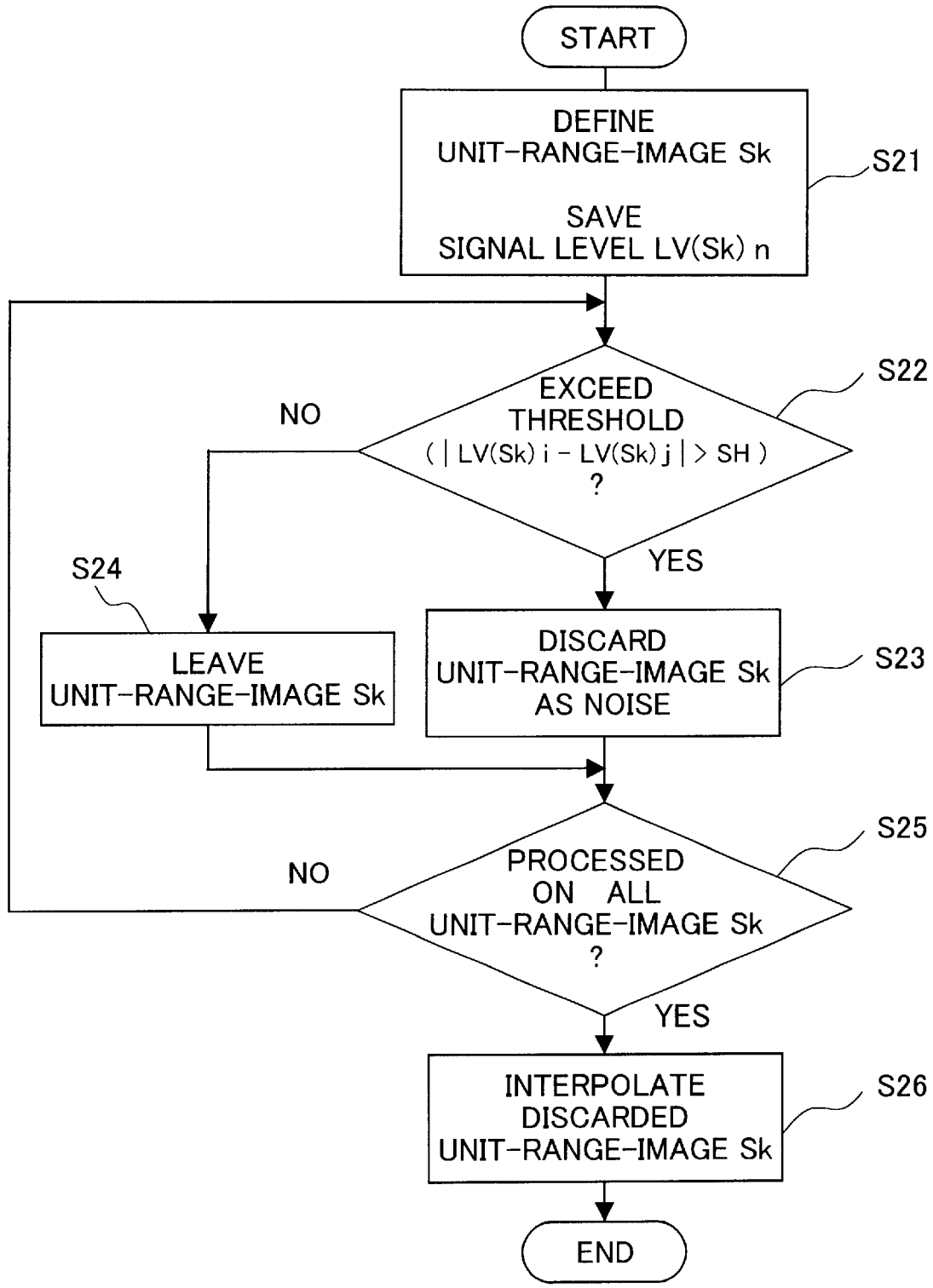
FIG. 5 is a flow chart for explaining the operation of a second embodiment.

In the followings, noise removal and interpolation processes in the demodulator unit 4 are explained by using a flow chart shown in FIG. 5.

The noise removal process of step S21–S25 are in common with the first embodiment, so in this embodiment, the interpolation process is explained. The interpolation process is applied to a range image already noise components removed and only the target object TG included, and is executed on unit-range-images Sk which are discarded from the range image because they are noises(step S26).

Figure 6:
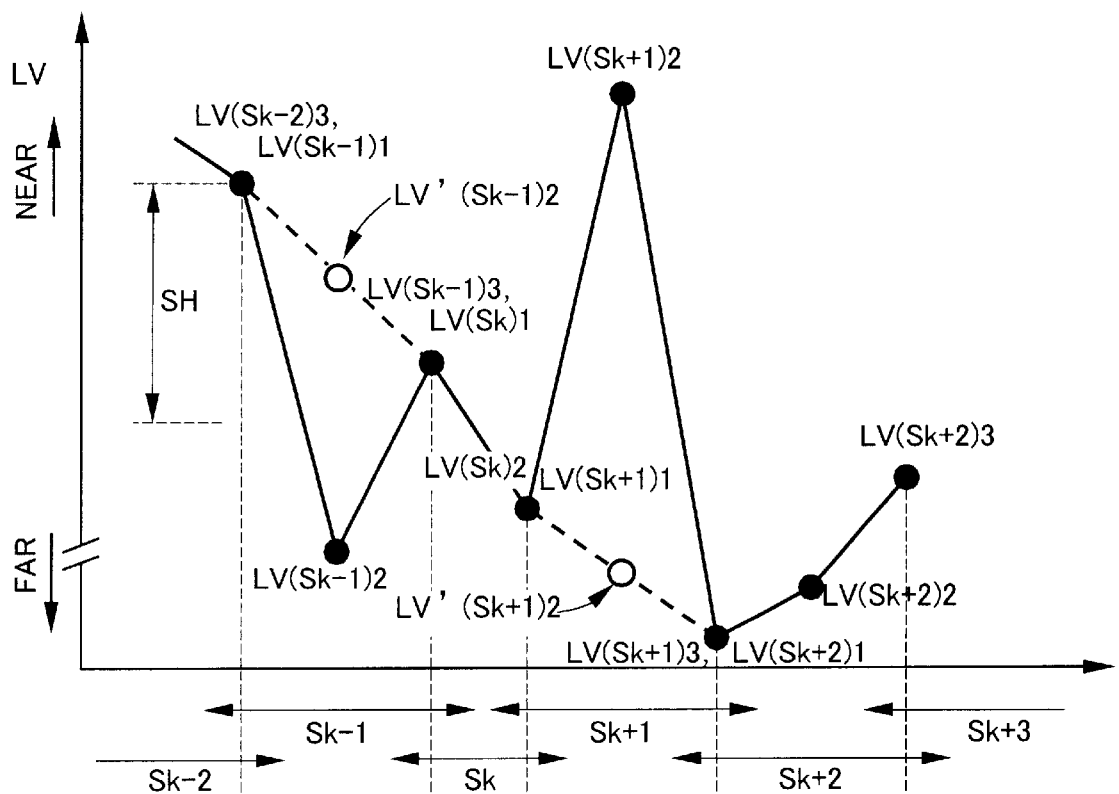
FIG. 6 is a chart for explaining the operation of the second embodiment.

For example, followings are assumed that, as shown in FIG. 6, after comparison signal levels LV in the five serial unit-range-images Sk−2, Sk−1, Sk, Sk+1, and Sk+2 with a threshold SH, two unit-range-images Sk−1 and Sk+1 are discarded as noise, and neighboring unit-range-images Sk−2, Sk, and Sk+2 are left as not noise.

In this case, the demodulator unit 4 interpolates the discarded unit-range-image Sk−1 and Sk+1 by lines connecting the end signal levels of the not discarded unit-range-image Sk−2, Sk, and Sk+2, that is, a line LV(Sk−2)3–LV(Sk)1 for Sk−1, and a line LV(Sk)2–LV(Sk+2)1 for Sk+1.

New signal levels LV'(Sk−1)2 and LV'(Sk+1)2 determined on the lines are stored in the memory as range images i.e. distance data for unit-range-images Sk−1 and Sk+1.

Figure 7:
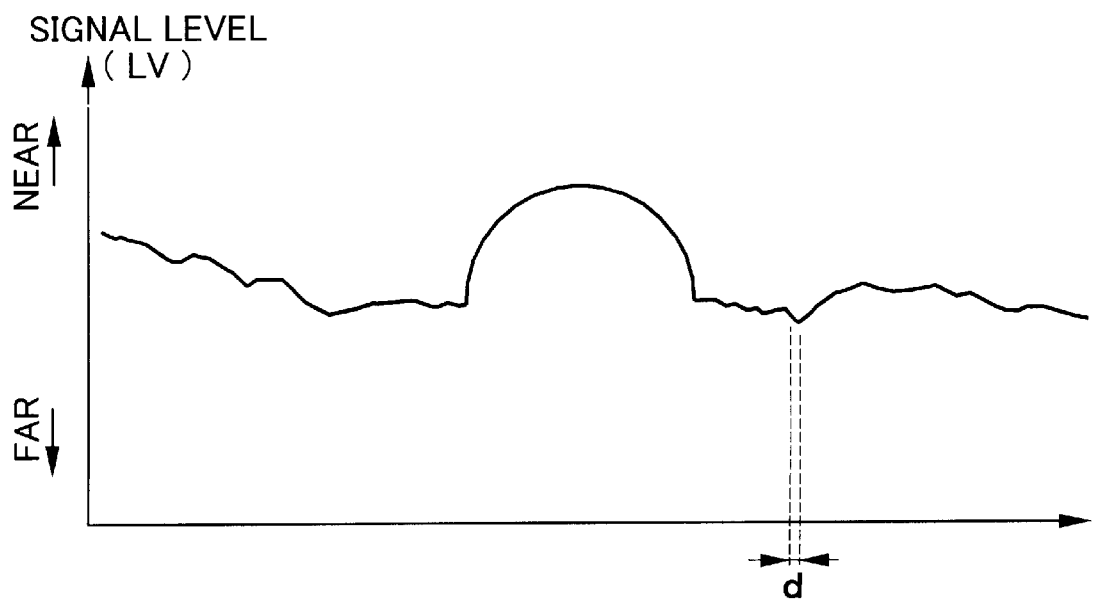
FIG. 7 is a signal level waveform chart for explaining the operation of the second embodiment.

Thus a processed range image is obtained, and processed signal levels are shown in FIG. 7 which is composed of a half circle waveform of target object TG and background waveform from which noise are removed by executing above-mentioned interpolation process for all discarded unit-range-images Sk.

As the result, in this embodiment, some part of the information on the background of the target object TG can come back alive, on the other hand, in the first embodiment, no background information is left because the unit-range-images Sk remain as discarded.

Third Embodiment

This embodiment the same as the second embodiment has a feature that interpolation processes are executed in the demodulator unit 4 on the discarded unit-range-images Sk.

The interpolation process has a feature that average values of signal levels LV(Sk)n are calculated with a plurality of unit-range-images in which variation of signal level LV does not exceed the threshold SH, and by using this average value the interpolation is executed on the discarded unit-rang-images Sk.

The arrangement of this embodiment is the same as of the first embodiment, thus figures and explanation about this are omitted.

In the followings, noise removal processes in the demodulator unit 4, that is, step S21–S25 in FIG. 5 are in common with the first and second embodiment, so in this embodiment, the interpolation process executed on unit-range-images Sk discarded because of noise is explained.

Figure 8:
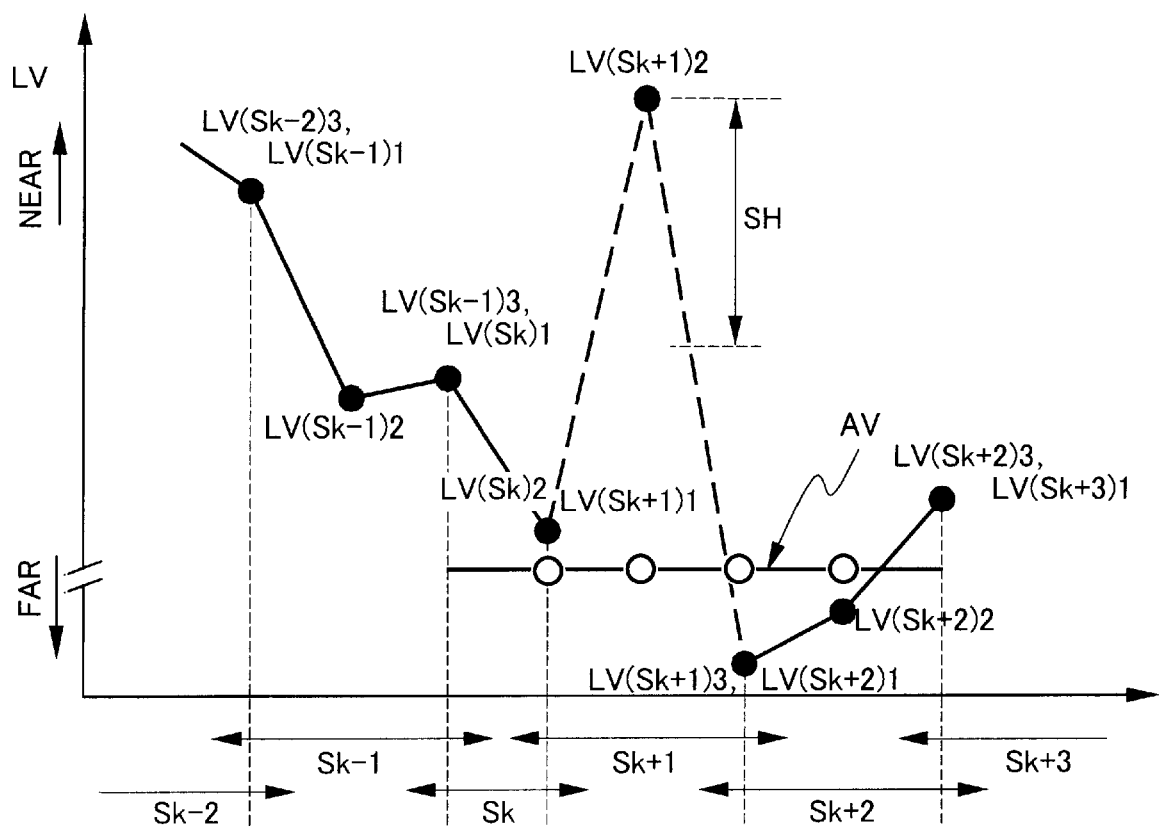
FIG. 8 is a chart for explaining the operation of a third embodiment.

For example, the same as the example in the second embodiment, as shown in FIG. 8, followings are assumed that after comparison signal levels LV in the four serial unit-range-images Sk−1, Sk, Sk+1, and Sk+2 with a threshold SH, unit-range-images Sk+1 is discarded as noise, and neighboring unit-range-images Sk and Sk+2 are left as not noise.

In this case, the demodulator unit 4 calculates an average value (algebraic mean value) AV of the signal levels in the unit-range-images Sk and Sk+2, that is, LV(Sk)1, LV(Sk)2, LV(Sk+2)1, LV(Sk+2)2, and LV(Sk+2)3.

And four signal levels in the discarded unit-range-image Sk+1 and its both side two unit-range-images Sk and Sk+2, that is, LV(Sk)2=LV(Sk+1)1, LV(Sk+1)2, LV(Sk+1)3=LV(Sk+2)1, and LV(Sk+2)2 are replaced by the average value AV, and then those are stored in the memory as new signal levels representing the range image of unit-range-images Sk, Sk+1, and Sk+2.

Figure 9:
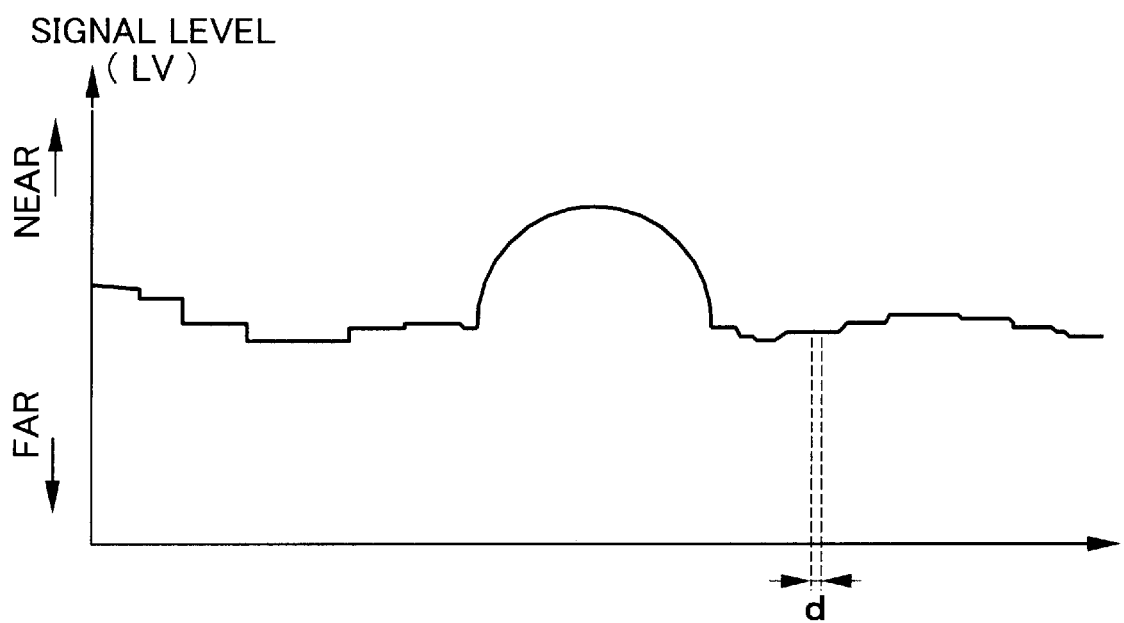
FIG. 9 is a signal level waveform chart for explaining the operation of the third embodiment.

Thus the same as the second embodiment, a processed range image is obtained, and processed signal levels are shown in FIG. 9 which is composed of a half circle waveform of target object TG and background waveform from which noise are removed by executing above-mentioned interpolation process for all discarded unit-range-images Sk.

As the result, in this embodiment, an averaged range image is obtained which has merits easy to see and following processes being simplified since the range image is averaged overall.

The merits result in compensation for the reduction of the background information in comparison with the second embodiment because not noise signal levels in Sk and Sk+2 also interpolated together.

Fourth Embodiment

This embodiment has a feature that a selection process is executed in the demodulator unit 4. First, the demodulator unit 4 defines a central-range-image locating in the middle of serial unit-range-images in which variation of signal levels does not exceed a threshold. And then, the unit 4 selects unit-range-images which has signal levels fall between a representative signal level of the central-range-image and a signal level calculated by adding a predetermined value to the representative signal level or by subtracting a predetermined value from the representative signal level.

The arrangement of this embodiment is the same as of the first embodiment, thus figures and explanation about this are omitted.

In the followings, a selection process of the demodulator unit 4 is described. However, noise removal processes are in common with the first embodiment, and also during the noise removal process, the selection process is executed only for the range image data of target object TG, so in this embodiment only the selection process is explained.

Figure 10:
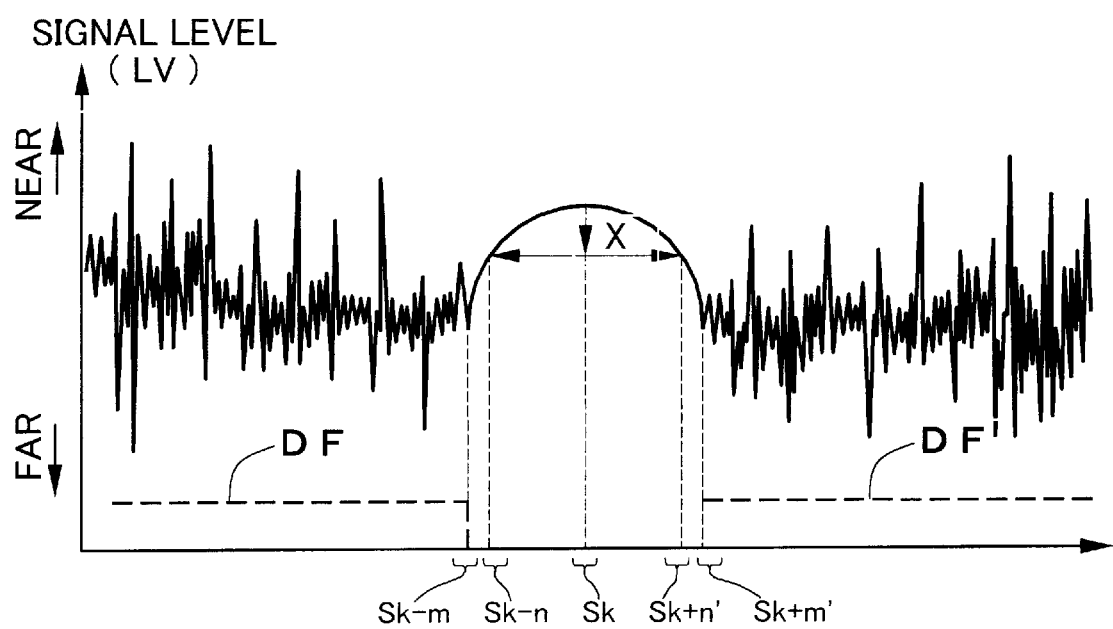
FIG. 10 is a signal level waveform chart for explaining the operation of a fourth embodiment.

An example of a waveform of signal levels of a range image as shown in FIG. 10 is used for explanation, which is composed of a half circle waveform of target object TG and waveforms of background at both sides of the half circle on which noise components are superimposed.

In the demodulator unit 4, the selection process is applied to the region of many serial unit-range-images Sk in which the variations of the signal levels do not exceed a threshold SH like the half circle in FIG. 10.

First, a unit-range-image in the middle between the both side ends Sk−m and Sk+m' of the series of above-mentioned is defined as a central-range-image Sk.

Second, one of the signal levels for example the maximum value in the central-range-image Sk is set as a representative LV(Sk)i, and then a signal level LV'(Sk)i is defined by subtracting a predetermined value X from the representative signal level LV(Sk)i.

Depending on the target object and measurement condition, the representative signal level LV(Sk)i is set by a minimum value in a central-range-image and the signal level LV'(Sk)i is defined by adding a value X to the level LV(Sk)i, or the representative signal level LV(Sk)i and the signal level LV'(Sk)i are defined by adding a value X to one of the signal levels in a central-range-image Sk, for example the maximum value M, and defined by subtracting the value X from the value M respectively.

Finally, in the demodulator unit 4, unit-range-images from Sk−n to Sk+n' are selected within the region from Sk−m to Sk+m', where the selected Sk−n to Sk+n' are such that the signal levels in them fall between the signal level LV(Sk)i in the central-range-image Sk and the signal level LV'(Sk)i apart X from LV(Sk)i. And then the selected unit-range-image from Sk−n to Sk+n' are stored in a separate memory.

Processing time can be reduced by using the selected unit-range-images from Sk−n to Sk+n'. And this is useful, for example, when the distance measuring apparatus is used for monitoring, since it is enough to detect partially the target object TG, and the shape of target object TG is substantially included in the selected unit-range-images.

Fifth Embodiment

This embodiment has a feature that one of the 1st, 2nd, 3rd, and 4th process (explained later) are chosen so as to apply the process to every plurality of blocks composed of a plurality of adjacent unit-range-images.

The arrangement of this embodiment is the same as of the first embodiment, thus figures and explanation about this are omitted.

The demodulator unit 4 in this embodiment can selectively execute followings; the noise removal process explained in the first embodiment(1st process), the noise removal and interpolation process explained in the second embodiment (2nd process), the noise removal and interpolation process explained in the third embodiment(3rd process), and the noise removal and selection process explained in the fourth embodiment(4th process).

Further, in the demodulator unit 4, a block-signal and a selection-signal are given from the outside of the distance measuring apparatus.

The block-signal defines a plurality of unit-range-images as one block, and the selection-signal selects one of the 1st, 2nd, 3rd, and 4th process for each block.

The block-signal is generated prior to the 1st to 4th process execution for example when a desired region in the range image displayed on the display unit B is selected by an operator with a mouse or such a pointing device.

The selection-signal is generated for example when either of the 1st to 4th process is selected by an operator with an input means such a keyboard or a mouse.

Figure 11:
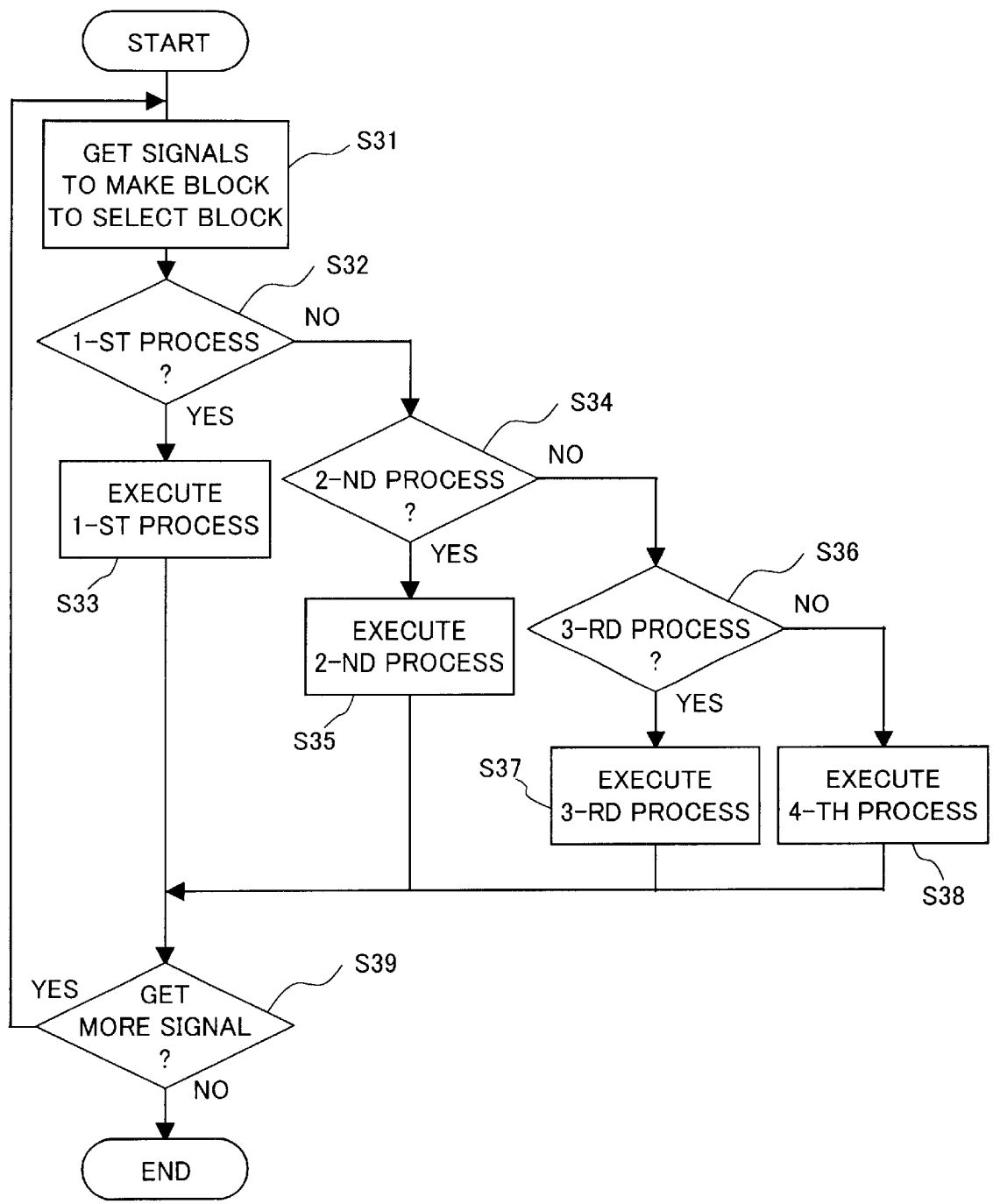
FIG. 11 is a flow chart for explaining the operation of a fifth embodiment.

In the followings, the processing operation of the demodulator unit 4 in this embodiment is explained by using a flow chart shown in FIG. 11. From the first to fourth processes are already explained in the first to fourth embodiments, so explanation on those processes are omitted.

First, in the demodulator unit 4, the block-signal and the selection-signal are received, then the selection-signal is evaluated to know which process of the 1st to 4th are selected, and the selected process is executed for the plurality of unit-range-images in the block defined by the block-signal.

Those steps are repeated until all of unit-range-images are processed by one of the four processes.

For example, the selection and application are done as follows. The first process is applied to a block such that noise components are prevailing and the background distance information is not so important, in order to remove the noise together background. The second process is applied to a block where the background distance information is necessary in order to leave the background data in some extent. The third process is applied if both of the background information and the processing time are desired to save. The fourth process is applied if it is enough to recognize part of the target object such as human body.

Thus in this embodiment, proper measurement is possible in response to the purposes or needs and so the usefulness increases.

In addition to above-mentioned process, the first to fourth embodiments, it may be done to differentiate every unit-range-image and in combination to execute background removal process in the range image such that unit-range-images regarded as noise are already discarded from it.

If such differentiation and background removal processes are executed in the demodulator unit 4, the boundary between the target object TG and the background can be made clear.

Sixth Embodiment

This embodiment has a feature that if the received quantity of light is insufficient a range image obtaining process in the demodulator unit 4 is not executed.

The arrangement of this embodiment is the same as of the first embodiment, thus figures and explanation about this are omitted.

In the demodulator unit 4 of this embodiment, a plurality of base-regions are defined which are composed of predetermined number of serial picture elements in the light receiving device of the light receiver unit 3. And if the received quantity of light in a base-region is less than a predetermined level criterion, a range image obtaining process for that base-region is not executed. Where the received quantity of light corresponds to the total amount of the levels of the received-light-signal in the base-region putted out from the light receiver unit 3.

Figure 12:
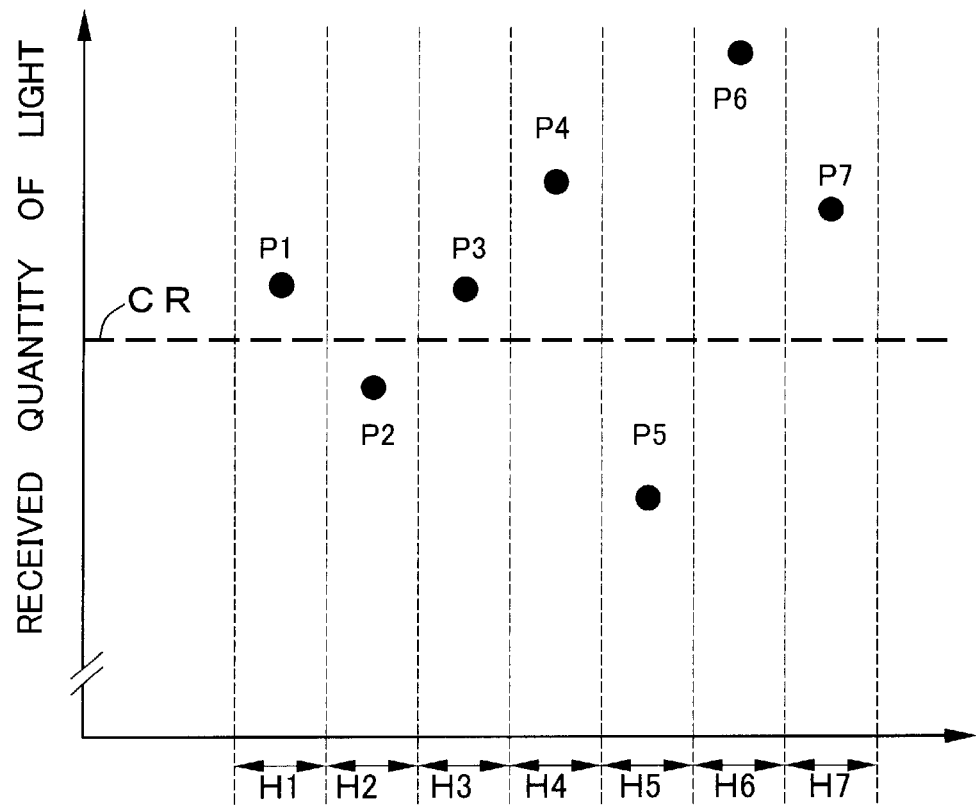
FIG. 12 is a chart for explaining the operation of a sixth embodiment.

For example, when the received quantity of light P1, P2, . . . in the base-region H1, H2, . . . are distributed as shown in FIG. 12, the demodulator unit 4 compares each received quantity of light P1, P2, . . . with predetermined level criterion CR, and concludes not to execute the range image obtaining process for the base-region H2 and H5 since the received quantity of light P2 and P5 are less than the level criterion CR, and to execute the range image obtaining process for the base-region H1, H3, and H4, . . . since the received quantity of light P1, P2, and P4, . . . are more than the level criterion. The level criterion CR may be determined according to the measuring circumstances and/or the target object.

After the execution of the range image obtaining process, any of the process explained in the first to fifth embodiments i.e. noise removal, interpolation, and selection is executed in the demodulation unit 4 for the obtained range image.

If the received quantity of light which is received in the light receiver unit 3 is insufficient, the distance information to the target object TG can not be obtained precisely. Therefore in this embodiment if the received quantity of light is insufficient in a base-region, the range image obtaining process is not executed for the base-region and the processing time can be saved.

Seventh Embodiment

This embodiment has a feature that if the received quantity of light is judged to be insufficient a range image obtaining process is not executed in the demodulator unit 4. The latter half point is the same as the sixth embodiment, however, the former half judgment method is different. If an average value of the received quantity of light for a plurality of serial base-regions is less than a predetermined level criterion, the received quantity of light is judged to be insufficient, and the range image obtaining process is not executed in the demodulator unit 4 for those base-regions.

The arrangement of this embodiment is the same as of the first embodiment, thus figures and explanation about this are omitted.

Figure 13:
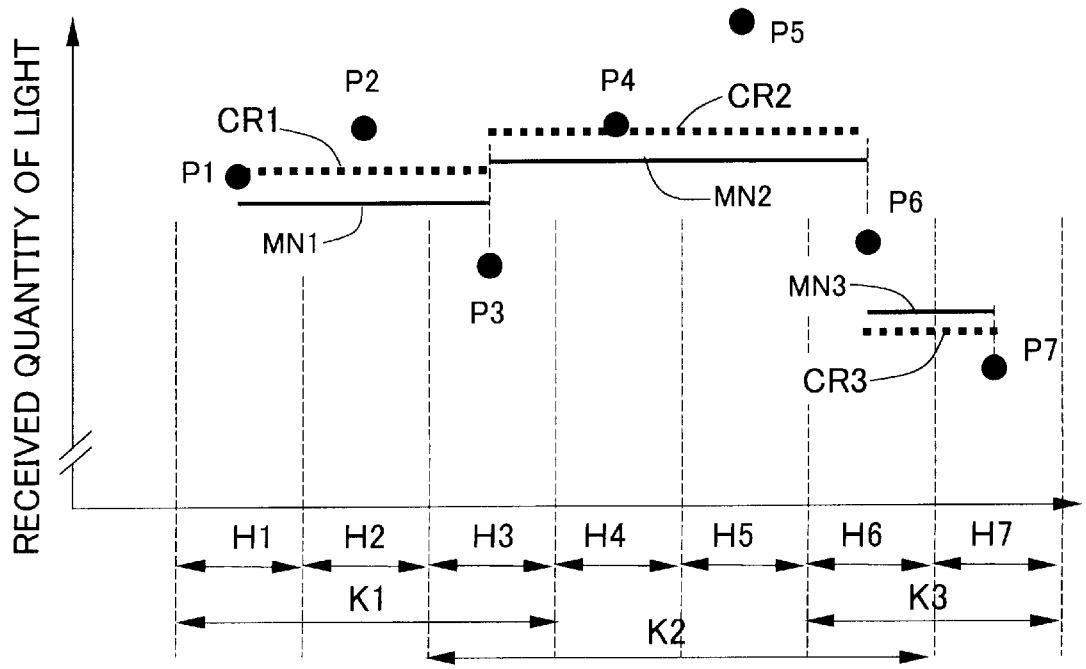
FIG. 13 is a chart for explaining the operation of a seventh embodiment.

In the demodulator unit 4, for example as shown in FIG. 13, section K1 is defined by the base-regions H1, H2, and H3, section K2 is defined by the base-regions H3 to H6, and section K3 is defined by the base-regions H6 and H7. Then algebraic average of the received quantity of light P1, P2, ... in the sections K1, K2, and K3 are derived as average values MN1=(P1+P2+P3)/3 in the section K1, MN2=(P3+P4+P5+P6)/4 in the section K2, and MN3=(P6+P7)/2 in the section K3.

In the demodulator unit 4, besides, level criteria corresponding to the number of the base-regions H1, H2, ... in the section K1, K2, ... are defined, that is, level criteria CR1 for number 3, CR2 for number 4, and CR3 for number 2.

Now, the average value MN1, and criterion CR1 in the section K1, MN2 and CR2 in the section K2, and MN3 and CR3 in the section K3 are compared respectively.

The range image obtaining process is not executed for the base-region H1 to H5 in the section K1 and K2, because average value MN1, MN2 is bellow the level criteria CR1 and CR2, and the range image obtaining process is executed for the base-region H6, H7, because MN3 is larger than CR3. The level criteria CR1, CR2, ... may be determined according to the measuring circumstances and/or the measuring target object.

After the execution of the range image obtaining process, any of the process explained in the first to fifth embodiments i.e. noise removal, interpolation, and selection is executed in the demodulation unit 4 for the obtained range image.

If such a process employing grouping-and-averaging treatment is executed in the demodulator unit 4, time to execute the range image obtaining process is further reduced comparing to the sixth embodiment where the received quantity of light is compared to the level criterion CR about each base-region H1, H2, ... one by one.

Further, if the variation of the received quantity of light between the base-region H1, H2, ... is large, those regions can be removed together from the object of the range image obtaining process. As the result, the accuracy increases.

Eighth Embodiment

By executing the processes mentioned in the sixth and seventh embodiment, a range image having sufficient received quantity of light is obtained. However, even though the received quantity of light is sufficient, if there exists large variation in the received quantity of light, for example there exists a light source in the light receiving area of the light receiver unit 3, the reliability of distance measurement decreases.

Thus, in this embodiment, the range image obtaining process is not executed when variation of received quantity of light between neighboring base-regions exceeds a predetermined threshold, even for a base-region in which the received quantity of light or the average value of received quantity of light is not less than the predetermined level criterion.

Figure 14:
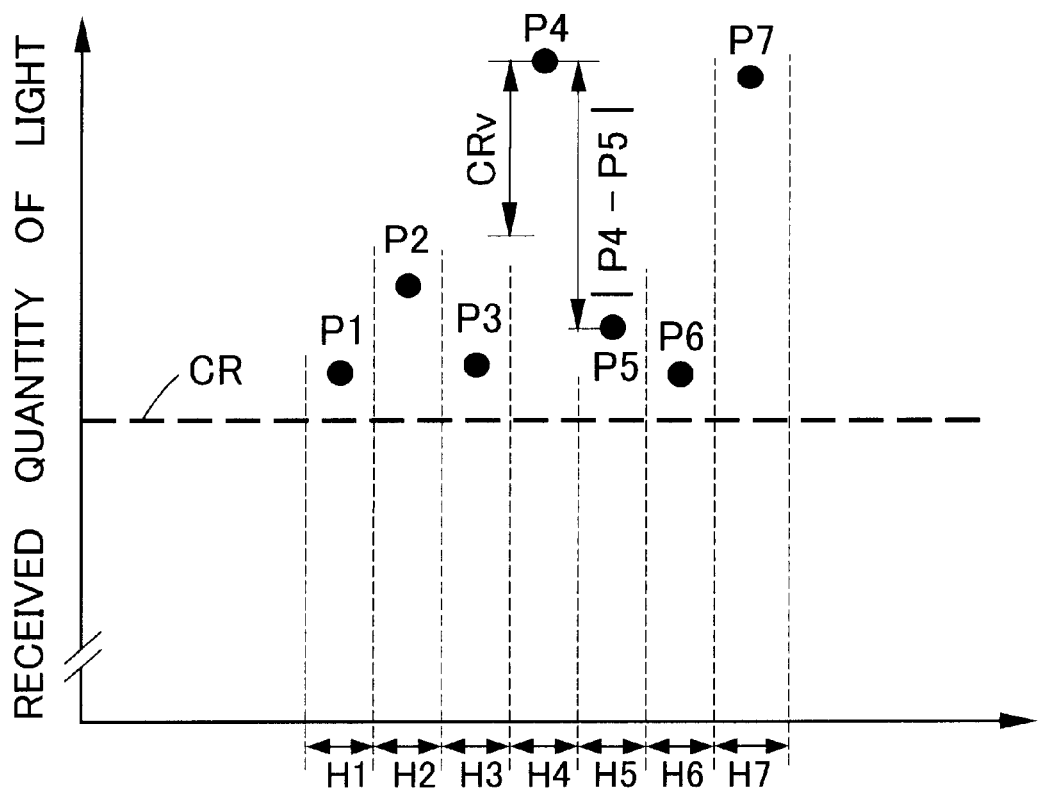
FIG. 14 is a chart for explaining the operation of a eighth embodiment.

For example as shown in FIG. 14, the received quantity of light from P1 to P7 in the base-regions from H1 to H7 exceed the level criterion CR. Under those circumstances, in the demodulator unit 4, the variation of the received quantity of light i.e. differences P1–P2, P2–P3, ... of the neighboring base-regions H1 and H2, H2 and H3, ... are calculated, and for the received quantity of light from P3 to P7 the range image obtaining process is not executed since those variations exceed a predetermined threshold CRv.

Thus, distance measuring performance and reliability increase since the range image obtaining process is not executed for the base-regions such that variation of received quantity of light between neighboring base-regions exceeds a predetermined threshold CRv in them. The threshold CRv may be determined according to the measuring circumstances and/or the measuring target object.

Ninth Embodiment

This embodiment has a feature that a region in an obtained range image is regarded as noise if the variation of the signal levels in the region exceeds a predetermined threshold, and furthermore the region regarded as noise is assigned a uniform signal level.

Here, the noise removal process in the demodulator unit 4 is explained by using FIG. 3 which is introduced in the first embodiment.

The situation is that the target object TG having a sphere-like shape exists at the forward center of a light receiving device. And this situation is shown in FIG. 3 by the waveform of signal levels LV along one horizontal line of the range image. The shape of the target object TG is shown in the center as the half circle, and superimposed noise components are shown at both sides of it in FIG. 3.

First, in the demodulator unit 4, as explained in the first embodiment, the unit-range-image is defined, and the signal levels of the range image data in each unit-range-image are stored in the memory, and variations of the signal levels in each unit-range-image are evaluated whether each of them exceeds a predetermined threshold or not.

Then, in the demodulator unit 4, if the variation of the signal levels in a unit-range-image exceeds the threshold, the unit-range-image is regarded as noise, and signal levels of all unit-range-images regarded as noise are stored in a separate memory or in the same memory but different region, and original signal levels are replaced by a predetermined default values namely a uniform signal level.

Here, in this embodiment the same as the first embodiment, the target object TG is assumed to be one human body, therefore if the variation of signal level dose not exceed threshold, it is concluded that the unit-range-images shows a smooth shape target object i.e. a human body.

Thus if the variation of the signal levels exceeds threshold, the signal levels are regarded as noise and replaced by a default value. Then a range image is obtained which shows only target object TG coming from the unit-range-images not replaced by a default value. Thus by using this range image, the distance to the target object and the shape of it can be accurately measured without influence of noise.

Figure 15:
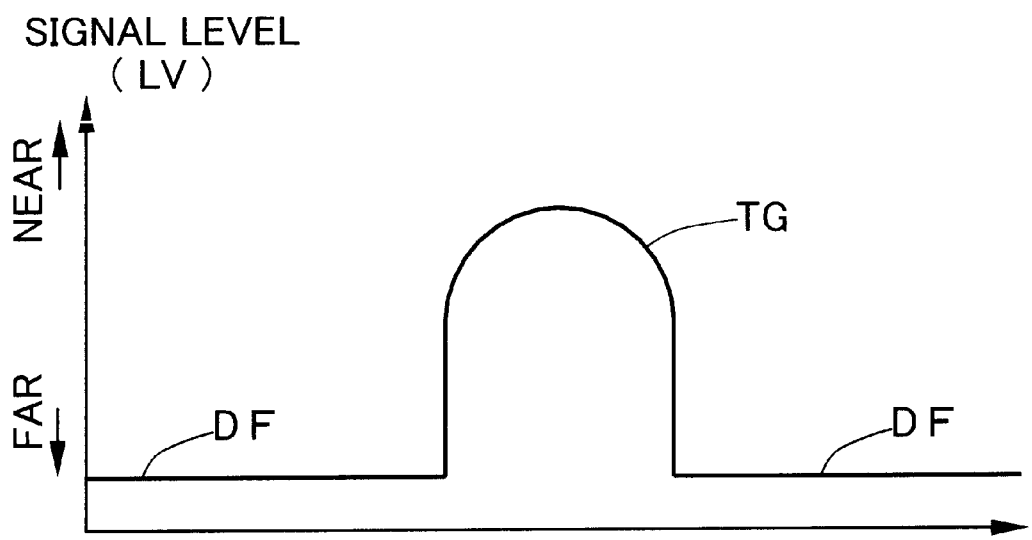
FIG. 15 is a signal level waveform chart for explaining the operation of a ninth embodiment.

For example as shown in FIG. 15, if the shape of the signal level waveform of the target object is convex, i.e. the target object TG has a shape such that its center is near in comparison with its periphery, the default value DF for the noise components is set as zero meaning infinitely far.

Figure 16:
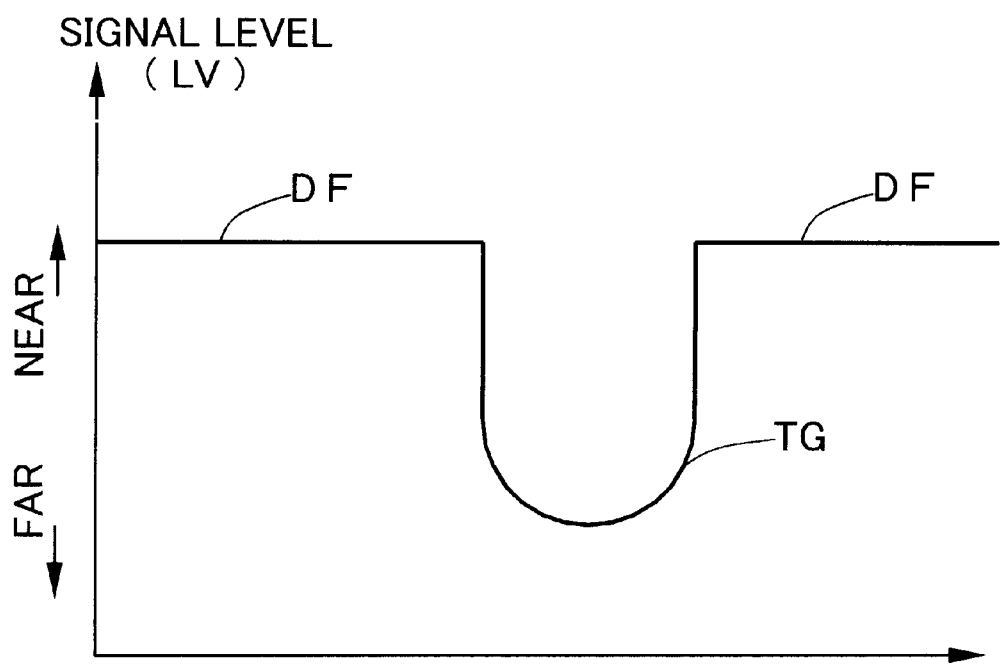
FIG. 16 is a signal level waveform chart for explaining the operation of the ninth embodiment.

On the contrary, as shown in FIG. 16, if the shape of the signal level waveform of the target object is concave(convex downward), i.e. the target object TG has a shape such that its center is far in comparison with its periphery, the default value DF for the noise components is set larger enough than the signal levels of its periphery, for example the near limit of measurable distance as the default value.

Figure 17:
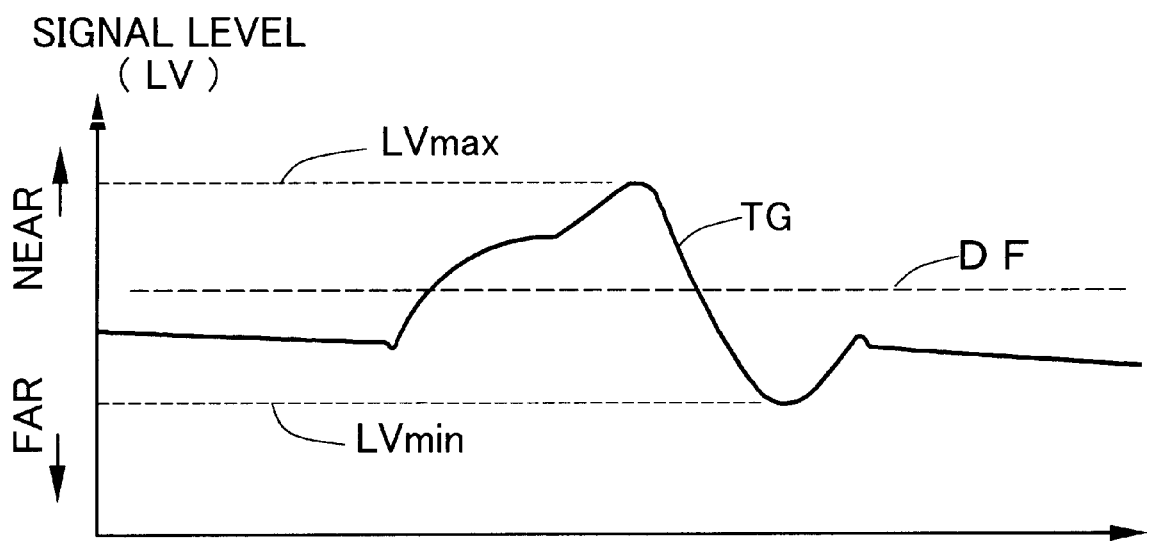
FIG. 17 is a signal level waveform chart for explaining the operation of the ninth embodiment.
Figure 18:
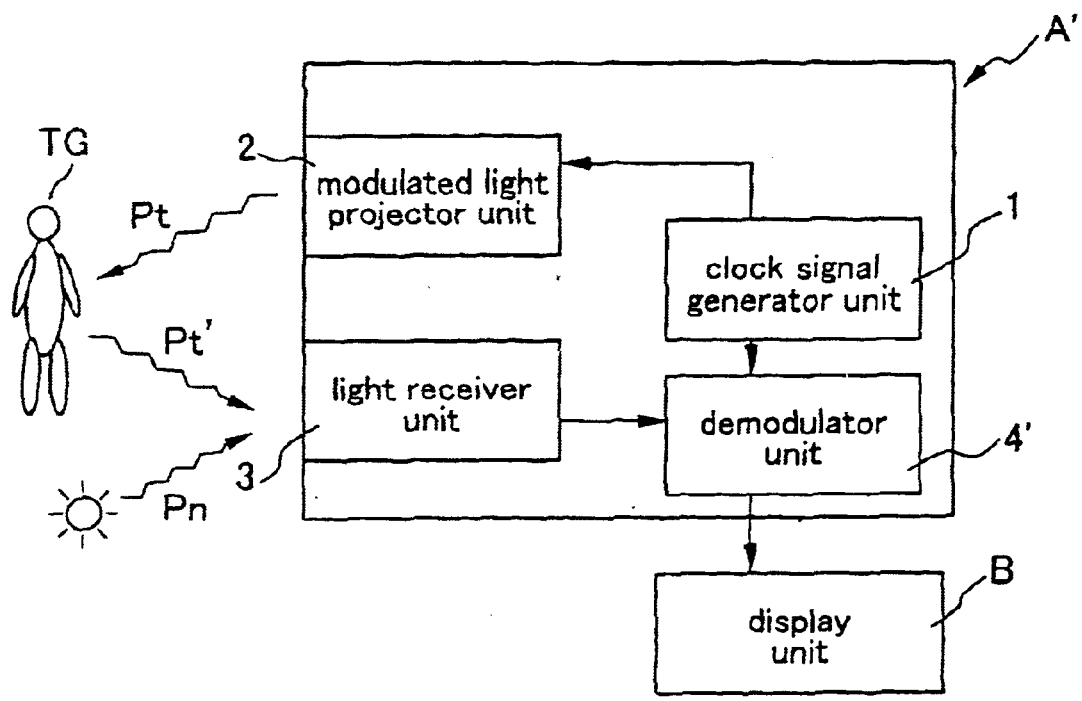
FIG. 18 is a block diagram for showing the arrangement of a conventional distance measuring apparatus.
Figure 19:
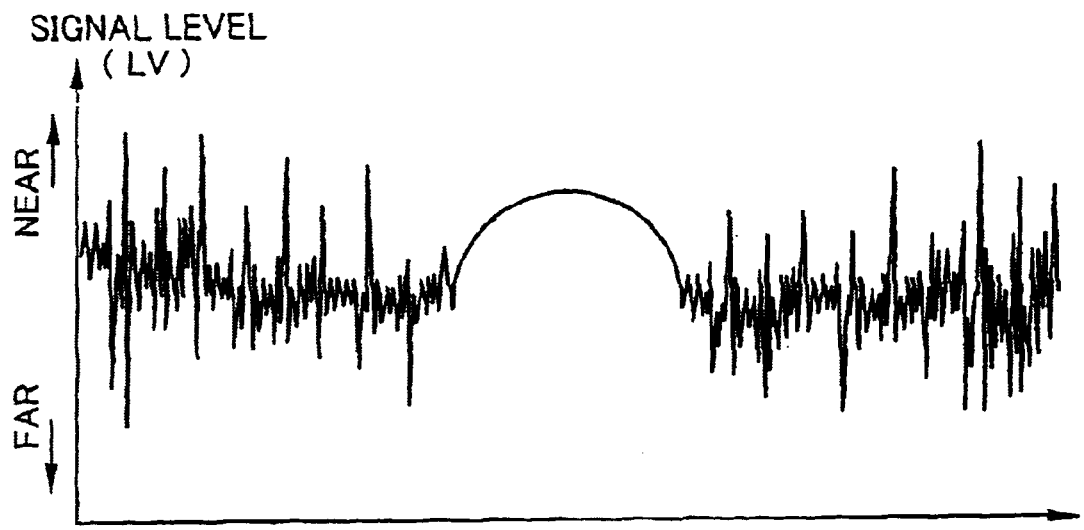
FIG. 19 is a flow chart for explaining the operation of a conventional distance measuring apparatus.

Furthermore, as shown in FIG. 17, if the middle of the target object TG in comparison with its periphery has both convex and concave shapes toward near side, the default value DF for the noise components is set a value of mid position between convex part (the maximum value LVmax in FIG. 17) and concave part (the minimum value LVmin in FIG. 17), i.e. the value calculated by DF=(LVmax+LVmin)/2.

The present invention is not limited to the configuration of the above-mentioned embodiment but can be modified in a variety of manners without departing from the gist of the invention.

What is claimed is:

1. An apparatus for measuring a distance to a target object and a shape of said target object with a range image obtained beforehand containing information of distances to objects including said target object, the improvement of the apparatus comprising:
    a range image obtaining system that obtains said range image, presenting signal levels changing according to said distances to the objects, by irradiating light onto the objects and receiving reflected light from the objects by a light receiving device; and
    a range image processing system that divides said obtained range image into a number of unit-range-images so as to discard every unit-range-image as noise if variation of a signal level in the unit-range-image exceeds a predetermined threshold, and to save every unit-range-image as usable range image if variation of signal levels in the unit-range-image does not exceed the threshold.

2. The apparatus set forth in claim 1, wherein said range image processing system interpolates said discarded unit-range-images by using unit-range-images in which variation of signal levels does not exceed said threshold and which are adjacent to said discarded unit-range-images.

3. The apparatus set forth in claim 1, wherein said range image processing system interpolates said discarded unit-range-images by using average values calculated from a plurality of unit-range-images in which variation of signal levels does not exceed said threshold.

4. The apparatus set forth in claim 1, wherein said range image processing system defines a central-range-image locating in the middle of serial unit-range-images in which variation of signal levels does not exceed said threshold, and selects unit-range-images which have signal levels falling between a representative signal level of said central-range-image and a signal level calculated by adding a predetermined value to said representative signal level or by subtracting a predetermined value from said representative signal level.

5. The apparatus set forth in claim 1, wherein said range image processing system differentiates every unit-range-image in said range image, from which unit-range-images regarded as noise are already discarded, so that a background image other than said target object is removed.

6. An apparatus for measuring a distance to a target object and a shape of the target object with a range image obtained beforehand containing information of distances to objects including the target object, the apparatus comprising:
    a range image obtaining system that obtains the range image and that presents signal levels changing according to the distances to the objects, by irradiating light onto the objects and receiving reflected light from the objects by a light receiving device,
    said range image obtaining system defines a plurality of base-regions composed of a predetermined number of serial picture elements in the light receiving device, and executes a range image obtaining process except for base regions in which a received quantity of light is less than a predetermined level, and
    wherein said range image obtaining system does not execute the range image obtaining process for a base-region in which one of the received quantity of light and an average value of the received quantity of light is not less than the predetermined level when variation of the received quantity of light between neighboring base-regions exceeds a predetermined value.

7. An apparatus for measuring a distance to a target object and a shape of the target object with a range image obtained beforehand containing information of distances to objects including the target object, the apparatus comprising:
    a range image obtaining system that obtains the range image and that presents signal levels changing according to the distances to the objects, by irradiating light onto the objects and receiving reflected light from the objects by a light receiving device,
    said range image obtaining system defines a plurality of base-regions composed of predetermined number of serial picture elements in the light receiving device, and executes a range image obtaining process except for a plurality of serial base-regions in which an average value of the received quantity of light is less than a predetermined level , and
    wherein said range image obtaining system does not execute the range image obtaining process for a base-region in which one of the received quantity of light and an average value of the received quantity of light is not less than the predetermined level when variation of the received quantity of light between neighboring base-regions exceeds a predetermined value.

8. An apparatus for measuring a distance to a target object and a shape of the target object with a range image obtained beforehand containing information of distances to objects including the target object, the apparatus comprising:
    a range image obtaining system that obtains the range image and that presents signal levels changing according to the distances to the objects, by irradiating light onto the objects and receiving reflected light from the objects by a light receiving device,
    said range image obtaining system defines a plurality of base-regions composed of a predetermined number of serial picture elements in the light receiving device, and executes a range image obtaining process except for base regions in which a received quantity of light is less than a predetermined level,
    wherein said range image obtaining system does not execute the range image obtaining process for a base-region in which one of the received quantity of light and an average value of the received quantity of light is not less than the predetermined level when a variation of the received quantity of light between neighboring base-regions exceeds a predetermined value, and wherein said range image processing system regards a region of the range image, corresponding to the base-region in which variation of the received quantity of light exceeds a predetermined threshold, as noise and assigns a uniform signal level to the region.

9. An apparatus for measuring a distance to a target object and a shape of the target object with a range image obtained beforehand containing information of distances to objects including the target object, the apparatus comprising:

a range image obtaining system that obtains the range image and that presents signal levels changing according to the distances to the objects, by irradiating light onto the objects and receiving reflected light from the objects by a light receiving device, said range image obtaining system defines a plurality of base-regions composed of a predetermined number of serial picture elements in the light receiving device, and executes a range image obtaining process except for base regions in which a received quantity of light is less than a predetermined level, wherein said range image obtaining system does not execute the range image obtaining process for a base-region in which one of the received quantity of light and an average value of the received quantity of light is not less than the predetermined level when variation of the received quantity of light between neighboring base-regions exceeds a predetermined value, and wherein said range image processing system regards a region of the range image in which variation of signal levels exceeds a predetermined threshold as noise, and assigns a uniform signal level to the region.

10. An apparatus for measuring a distance to a target object and a shape of the target object with a range image obtained beforehand containing information of distances to objects including the target object, the apparatus comprising:

a range image obtaining system that obtains the range image and that presents signal levels changing according to the distances to the objects, by irradiating light onto the objects and receiving reflected light from the objects by a light receiving device, said range image obtaining system defines a plurality of base-regions composed of and receiving reflected light from the objects by a light receiving device, predetermined number of serial picture elements in the light receiving device, and executes a range image obtaining process except for a plurality of serial base-regions in which an average value of the received quantity of light is less than a predetermined level, wherein said range image obtaining system does not execute the range image obtaining process for a base-region in which one of the received quantity of light and the average value of the received quantity of light is not less than the predetermined level when variation of the received quantity of light between neighboring base-regions exceeds a predetermined value, and wherein said range image processing system regards a region of the range image, corresponding to the base-region in which variation of the received quantity of light exceeds a predetermined threshold, as noise and assigns a uniform signal level to the region.

11. An apparatus for measuring a distance to a target object and a shape of the target object with a range image obtained beforehand containing information of distances to objects including the target object, the apparatus comprising:

a range image obtaining system that obtains the range image and that presents signal levels changing according to the distances to the objects, by irradiating light onto the objects and receiving reflected light from the objects by a light receiving device, said range image obtaining system defines a plurality of base-regions composed of predetermined number of serial picture elements in the light receiving device, and executes a range image obtaining process except for a plurality of serial base-regions in which an average value of the received quantity of light is less than a predetermined level, wherein said range image obtaining system does not execute the range image obtaining process for a base-region in which one of the received quantity of light and the average value of the received quantity of light is not less than the predetermined level when variation of the received quantity of light between neighboring base-regions exceeds a predetermined value, and wherein said range image processing system regards a region of the range image in which variation of signal levels exceeds a predetermined threshold as noise, and assigns a uniform signal level to the region.

12. The apparatus set forth in claim 8, wherein said range image processing system identifies a region of the range image, corresponding to the base-region in which variation of the received quantity of light does not exceed the predetermined threshold, with distance information showing a shape of the target object, and when the target object has a substantially convex shape, as viewed from the apparatus, said range image obtaining system assigns a signal level of relatively far to the region regarded as noise.

13. The apparatus set forth in claim 8, wherein said range image processing system identifies a region of the range image, corresponding to the base-region in which variation of the received quantity of light does not exceed the predetermined threshold, with distance information showing a shape of the target object, and when the target object has a substantially concave shape, as viewed from the apparatus, said range image obtaining system assigns a signal level of relatively near to the region regarded as noise.

14. The apparatus set forth in claim 10, wherein said range image processing system identifies a region of the range image, corresponding to the base-region in which variation of the received quantity of light does not exceed the predetermined threshold, with distance information showing a shape of the target object, and when the target object has both convex and concave shapes, as viewed from said apparatus, said range obtaining system assigns a signal level, that is substantially equal to a mid position between convex and concave parts of the target object, to the region regarded as noise.

15. The apparatus set forth in claim 10, wherein said range image processing system identifies a region of the range image, corresponding to the base-region in which variation of the received quantity of light does not exceed the predetermined threshold, with distance information showing a shape of the target object, and when the target object has a substantially convex shape, as viewed from the apparatus, said range image obtaining system assigns a signal level of relatively far to the region regarded as noise.

16. The apparatus set forth in claim 10, wherein said range image processing system identifies a region of the range image, corresponding to the base-region in which variation of the received quantity of light does not exceed the predetermined threshold, with distance information showing a shape of the target object, and when the target object has a substantially concave shape, as viewed from the apparatus, said range image obtaining system assigns a signal level of relatively near to the region regarded as noise.

17. The apparatus set forth in claim 10, wherein said range image processing system identifies a region of the range image, corresponding to the base-region in which variation of the received quantity of light does not exceed the predetermined threshold, with distance information showing a shape of the target object, and when the target object has both convex and concave shapes, as viewed from said apparatus, said range obtaining system assigns a signal level, that is substantially equal to a mid position between convex and concave parts of the target object, to the region regarded as noise.

18. The apparatus set forth in claim 9, wherein said range image processing system identifies a region of the range image in which variation of signal levels does not exceed a predetermined threshold with distance information showing a shape of the target object, and when the target object has a substantially convex shape, as viewed from the apparatus, said range image obtaining system assigns a signal level of relatively far to the region regarded as noise.

19. The apparatus set forth in claim 9, wherein said range image processing system identifies a region of the range image in which variation of signal levels does not exceed a predetermined threshold with distance information showing a shape of the target object, and when the target object has a substantially concave shape, as viewed from the apparatus, said range image obtaining system assigns a signal level of relatively near to the region regarded as noise.

20. The apparatus set forth in claim 9, wherein said range image processing system identifies a region of the range image in which variation of signal levels does not exceed a predetermined threshold with distance information showing a shape of the target object, and when the target object has both convex and concave shapes, as viewed from said apparatus, said range obtaining system assigns a signal level, that is substantially equal to a mid position between convex and concave parts of the target object, to the region regarded as noise.

21. The apparatus set forth in claim 11, wherein said range image processing system identifies a region of the range image in which variation of signal levels does not exceed a predetermined threshold with distance information showing a shape of the target object, and when the target object has a substantially convex shape, as viewed from the apparatus, said range image obtaining system assigns a signal level of relatively far to the region regarded as noise.

22. The apparatus set forth in claim 11, wherein said range image processing system identifies a region of the range image in which variation of signal levels does not exceed a predetermined threshold with distance information showing a shape of the target object, and when the target object has a substantially concave shape, as viewed from the apparatus, said range image obtaining system assigns a signal level of relatively near to the region regarded as noise.

23. The apparatus set forth in claim 11, wherein said range image processing system identifies a region of the range image in which variation of signal levels does not exceed a predetermined threshold with distance information showing a shape of the target object, and when the target object has both convex and concave shapes, as viewed from said apparatus, said range obtaining system assigns a signal level, that is substantially equal to a mid position between convex and concave parts of the target object, to the region regarded as noise.

* * * * *

UNITED STATES PATENT AND TRADEMARK OFFICE
CERTIFICATE OF CORRECTION

PATENT NO. : 6,639,656 B2
DATED : October 28, 2003
INVENTOR(S) : Y. Takada et al.

Page 1 of 1

It is certified that error appears in the above-identified patent and that said Letters Patent is hereby corrected as shown below:

<u>Column 15,</u>
Lines 49-50, delete "and receiving reflected light from the objects by a light receiving device."

<u>Column 16,</u>
Line 50, "claim 10" should be -- claim 8 --.

Signed and Sealed this

First Day of June, 2004

JON W. DUDAS
*Acting Director of the United States Patent and Trademark Office*